(No Model.)
C. W. SMITH.
DETACHABLE HANDLE FOR COFFEE POTS OR OTHER COOKING UTENSILS.
No. 582,439. Patented May 11, 1897.
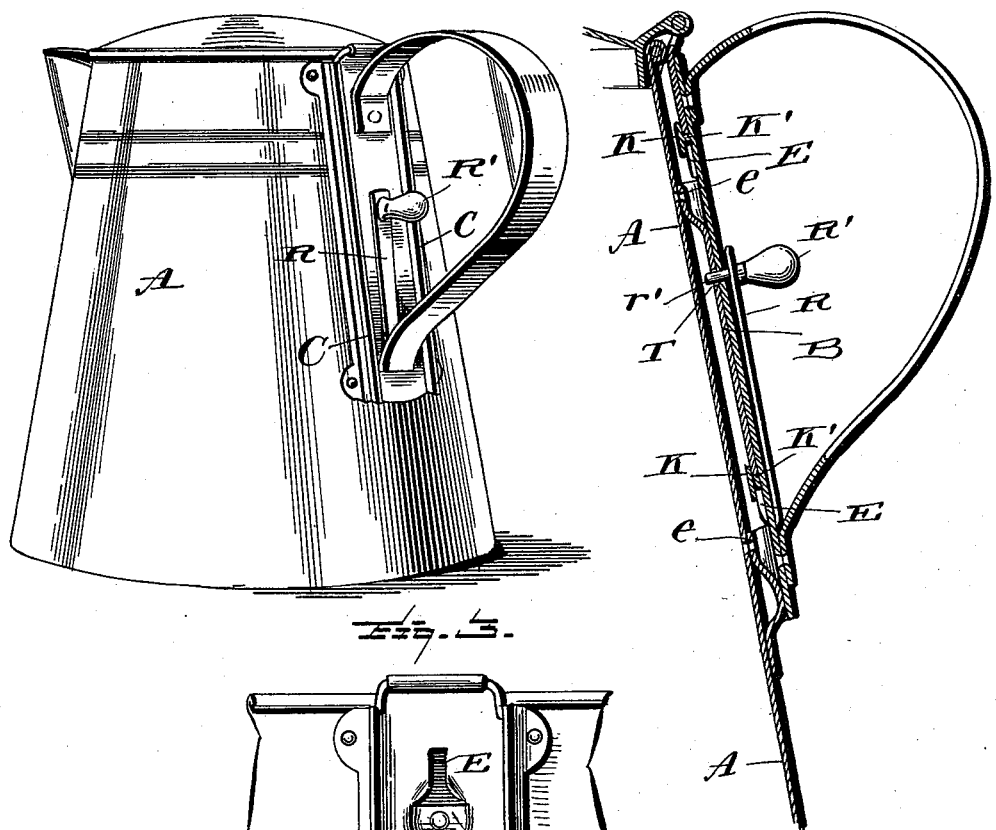
Witnesses:
L. C. Hills.
A. L. Hough.
Inventor:
C. W. Smith,
by Franklin H. Hough
Atty.

UNITED STATES PATENT OFFICE.

CHARLES W. SMITH, OF WAVERLY, OHIO.

DETACHABLE HANDLE FOR COFFEE-POTS OR OTHER COOKING UTENSILS.

SPECIFICATION forming part of Letters Patent No. 582,439, dated May 11, 1897.

Application filed February 26, 1897. Serial No. 625,191. (No model.)

*To all whom it may concern:*

Be it known that I, CHARLES W. SMITH, a citizen of the United States, residing at Waverly, in the county of Pike and State of Ohio, have invented certain new and useful Improvements in Detachable Handles for Coffee-Pots or other Cooking Utensils; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in coffee-pots and other cooking utensils, and especially to a removable handle which may be easily and quickly attached to a coffee-pot or other cooking utensil or removed therefrom when it is desired.

More specifically the invention consists of a detachable handle carrying on a suitable plate headed lugs which are designed to be inserted in slots in a plate which is secured to the body of the coffee-pot and securely held therein by means of a spring-actuated retaining member, as will be hereinafter described in detail.

To these ends and to such others as the invention may pertain the same consists, further, in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts throughout the several views, in which—

Figure 1 is a perspective view of the detachable handle shown as attached to a coffee-pot. Fig. 2 is a vertical sectional view through the lugs on the handle and the socket engaged thereby; Fig. 3, plan views of the handle removed and the slots designed to receive the lugs.

Reference now being had to the details of the drawings by letter, A designates the coffee-pot, which has secured thereto the plate B, attached thereto in any suitable manner and provided with ridges C, between which the detachable handle D is designed to be held. In the said plate B are the slots E, which open downward, the portions of the plate adjacent to each slot being depressed, as seen at e, so as to allow the head K of the lug K' to readily enter the slot, one at the upper end the other at the lower portion of the plate B.

Secured to the inner convexed surface of the plate to which the handle is attached is the retaining member, consisting of the spring-bar R, fastened at one end to the lower portion of the plate and carrying at its free end the knob R', which is provided with a lug r', which is normally seated in an aperture in the handle-plate, and its free end to engage in a hole T in the plate B after the lugs K have been slid into the slots E.

It will thus be seen that after placing the coffee-pot on a stove the handle may be quickly and easily removed by simply pulling out the knob end of the spring-retaining member and pressing down slightly on the handle sufficiently to release the heads of the lugs from the slots.

I am aware that it is old to construct removable handles for coffee-pots in which lugs engage in holes in the body of the pot or a plate attached thereto, the handle being held in place by means of a spring-actuated hook, and I claim no such construction.

What I claim is—

1. In combination with the body of the coffee-pot or other cooking utensil, a plate having slots therein open at corresponding ends, combined with a handle carrying headed lugs which are designed to engage in said slots, and a spring-actuated retaining member designed to engage in registering apertures in the handle-plate and the plate secured to the coffee-pot or other cooking utensil, whereby the handle may be locked securely in place.

2. In combination with the body of the coffee-pot or other cooking utensil, the plate B secured thereto, the said plate slotted at E with depressed portions adjacent to the open ends of the said slots, combined with the concaved handle-plate, the headed lugs secured thereto, designed to enter the slots, and the spring-actuated knob carrying a lug which is normally held in an aperture in the said concaved plate, and adapted to enter an aperture in the plate secured to the coffee-pot or other cooking utensil to hold the handle locked thereto, all substantially as shown and described.

In testimony whereof I affix my signature in presence of two witnesses.

CHARLES W. SMITH.

Witnesses:
JOAB DAVIS,
J. G. HELFENLEIN.